G. M. Hinkley,
Saw Swage.
No. 108,140.    Patented Oct. 11, 1870.
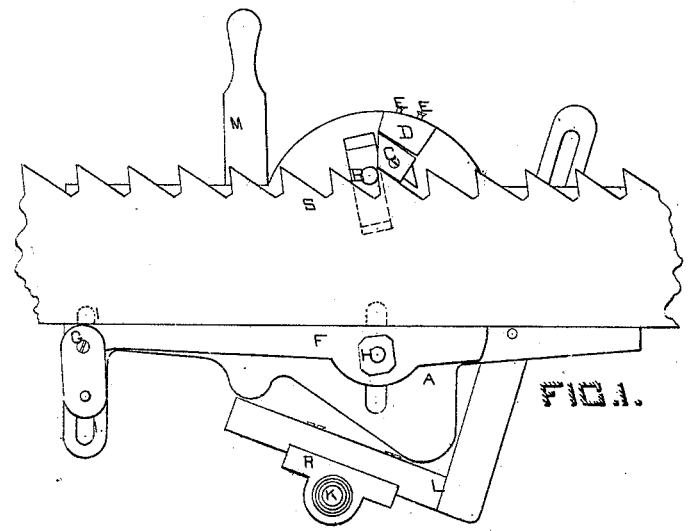
FIG. 1.
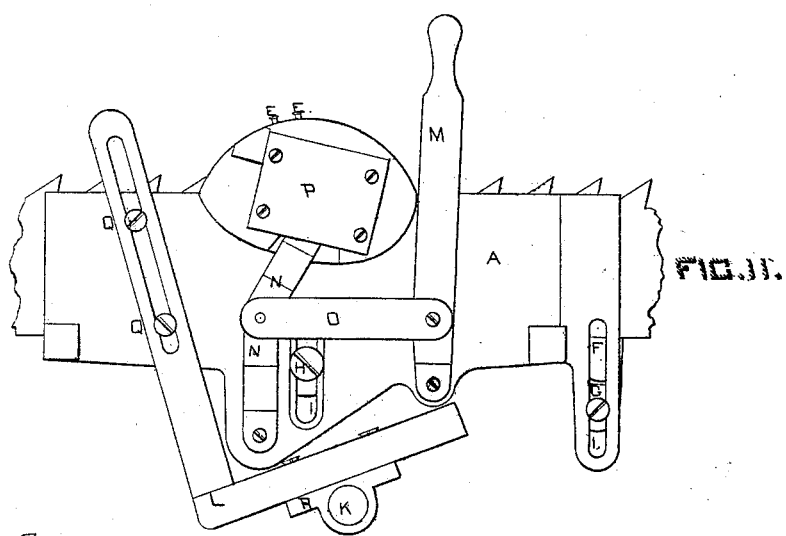
FIG. II.
FIG. III.
WITNESSES.
John Foshee
W. M. Hornor.
INVENTOR.
George M. Hinkley

United States Patent Office.

GEORGE M. HINKLEY, OF MILWAUKEE, WISCONSIN.

Letters Patent No. 108,140, dated October 11, 1870.

IMPROVEMENT IN SWAGING-MACHINES.

The Schedule referred to in these Letters Patent and making part of the same

I, GEORGE M. HINKLEY, of Milwaukee, in the county of Milwaukee, in the State of Wisconsin, have invented certain Improvements in Swaging-Machines, of which the following is a specification.

Nature and Objects of the Invention.

My invention is to swage saws on the hooking or cutting side of the teeth.

Description of the Drawing forming part of this Specification.

Figure 1 is a flat view of the swaging-machine on the front side.

Figure 2, a view of the back side of the machine.

Figure 3, a perspective view of a saw with the teeth swaged, showing the work when done.

General Description.

A is the body of the machine.

B, the swaging point, working in a slot in the body of the machine.

C, the die, on which the top side of the tooth rests when being swaged.

D, a block, with two screws E E in it, which run through, and their points strike against die C, and being either of them screwed down the most, will give the right pitch to the die.

F, a fence or guide, for the back side of a straight saw to rest against when having its teeth swaged.

G and H are screws and nuts, to hold fence in right position, the screws moving up or back in slots I.

K, a mandrel, fitting in frame L, on which to put a circular saw to be swaged, the fence F being removed for that purpose.

M, handle to the lever, which operates the swaging point B, pivoted at one end to the body A.

N, an elbow-lever, one end of it pivoted to the body A, and the other end to the swaging point B, and connected in the center by a pin passing through one end of center piece O, which connects handle M and elbow-lever N together.

P, cover, which holds swaging point B up to its place, there being a piece working over the slot in which the piece works in which is set the swaging point B, and these pieces, being all fastened together, form the point B.

Q Q, screws, which pass through a slot in frame L into body A, by loosening of which the frame can be moved up or run back for a large or small circular saw, and the mandrel K is set in a movable piece, R, and screws pass through a slot in the frame L, so that the mandrel may be moved back or forward, so as to bring the hook of the tooth onto the die C, so that it may be swaged properly.

S, teeth of the saw, their points flattened out on the under side.

The operation of this machine is, that a saw being laid on body A, the back of it resting against the fence F, the top side of a tooth resting on die C, and the swaging point being thrown back, is brought forward by the lever M N, and the tooth is swaged on the hooking side, and the point cut off to a uniform length.

Claims.

I claim as my invention—

1. A swaging-machine, with swage-point B and die C, arranged relatively to each other, as shown and described.

2. Mandrel K, frame L, and movable piece R, substantially as and for the purpose described.

GEORGE M. HINKLEY.

Witnesses:
J. B. SMITH,
E. SANFORD BLAKE.